(12) United States Patent
Olekas et al.

(10) Patent No.: US 11,632,582 B2
(45) Date of Patent: Apr. 18, 2023

(54) DISTRIBUTED MEASUREMENT OF LATENCY AND SYNCHRONIZATION DELAY BETWEEN AUDIO/VIDEO STREAMS

(71) Applicant: SSIMWAVE INC., Waterloo (CA)

(72) Inventors: Christopher Vytautas Olekas, Breslau (CA); Ian Wormsbecker, Baden (CA); Ahmed Badr, Waterloo (CA); Joshua Vijay Mohan, Kitchener (CA)

(73) Assignee: SSIMWAVE, Inc., Waterloo (CA)

( * ) Notice: Subject to any disclaimer, the term of this patent is extended or adjusted under 35 U.S.C. 154(b) by 0 days.

(21) Appl. No.: 17/173,309

(22) Filed: Feb. 11, 2021

(65) Prior Publication Data

US 2021/0258630 A1    Aug. 19, 2021

Related U.S. Application Data

(60) Provisional application No. 63/055,946, filed on Jul. 24, 2020, provisional application No. 62/976,169, filed on Feb. 13, 2020.

(51) Int. Cl.
| | |
|---|---|
| *H04N 21/43* | (2011.01) |
| *H04N 21/438* | (2011.01) |
| *H04N 5/073* | (2006.01) |
| *H04N 21/44* | (2011.01) |
| *H04N 21/439* | (2011.01) |

(52) U.S. Cl.
CPC ....... *H04N 21/4307* (2013.01); *H04N 5/0736* (2013.01); *H04N 21/4384* (2013.01); *H04N 21/4394* (2013.01); *H04N 21/44008* (2013.01)

(58) Field of Classification Search
CPC .......... H04N 21/4307; H04N 21/4384; H04N 21/4394; H04N 21/44008; H04N 5/0736
USPC ......................................................... 348/515
See application file for complete search history.

(56) References Cited

U.S. PATENT DOCUMENTS

| | | | | |
|---|---|---|---|---|
| 5,481,294 A | * | 1/1996 | Thomas ................. | H04H 20/31 348/180 |
| 8,311,983 B2 | | 11/2012 | Guzik | |
| 10,063,907 B1 | * | 8/2018 | Darrah ............. | H04N 21/44008 |
| 2009/0096874 A1 | * | 4/2009 | Hayashi ............... | H04N 17/004 348/192 |

(Continued)

FOREIGN PATENT DOCUMENTS

WO    2020170237 A1    8/2020

*Primary Examiner* — John W Miller
*Assistant Examiner* — Sean N. Haiem
(74) *Attorney, Agent, or Firm* — Brroks Kushman P.C.

(57) ABSTRACT

Real-time latency of audio/video streams is identified. Signatures of a reference audio/video stream and signatures of a test audio/video stream are buffered. A needle is constructed as a vector including a set of signatures of the reference audio/video stream. Correlations of the needle to successive vectors of sets of signatures of the test audio/video stream are computed using a correlation function that calculates relatedness of the needle vector to each of the successive vectors of the test audio/video stream. A synchronization offset is identified between the test stream and the reference stream according to a maximum correlation point of the correlations of the needle to the successive sets of signatures of the test audio/video stream. The reference audio/video stream and the test audio/video stream are aligned according to the synchronization offset.

33 Claims, 6 Drawing Sheets

(56) References Cited

U.S. PATENT DOCUMENTS

| | | | |
|---|---|---|---|
| 2011/0013889 A1* | 1/2011 | Wu | H04N 19/159 |
| | | | 386/356 |
| 2011/0096173 A1* | 4/2011 | Baker | H04N 17/004 |
| | | | 348/192 |
| 2012/0320966 A1* | 12/2012 | Guo | H04N 21/44008 |
| | | | 375/240.02 |
| 2013/0060956 A1* | 3/2013 | Nagaraj | H04N 21/85406 |
| | | | 709/231 |
| 2017/0337912 A1* | 11/2017 | Caligor | H04N 5/765 |
| 2018/0007395 A1* | 1/2018 | Ugur | H04N 21/4384 |
| 2018/0358027 A1* | 12/2018 | Srinivasan | G10L 25/18 |
| 2020/0260154 A1* | 8/2020 | Comito | H04N 5/76 |
| 2020/0280761 A1* | 9/2020 | Staples | H04N 21/4384 |
| 2020/0314468 A1* | 10/2020 | Kahler | H04L 65/601 |

\* cited by examiner

DISTRIBUTED MEASUREMENT OF LATENCY AND SYNCHRONIZATION DELAY BETWEEN AUDIO/VIDEO STREAMS

CROSS-REFERENCE TO RELATED APPLICATIONS

This application claims the benefit of U.S. provisional application Ser. No. 62/976,169 filed Feb. 13, 2020, and U.S. provisional application Ser. No. 63/055,946 filed Jul. 24, 2020 the disclosures of which are hereby incorporated in their entireties by reference herein.

TECHNICAL FIELD

Aspects of the disclosure generally relate to the distributed measurement of latency and synchronization delay between audio/video streams.

BACKGROUND

Measuring real-time latency between two streams can be very time consuming and cumbersome. One example technique for performing temporal alignment, and consequently latency measurement, is a manual process such as monitoring the frames of two videos and aligning them visually. Another technique that may be used is the performance of expensive frame-based measurement such as computing peak signal-to-noise ratio or any other frame-based differencing tool between every frame of the two videos to find the matched frames. Such methods, however, may run into timing constraints or may be overly complex to be practical.

SUMMARY

In a first illustrative example, a method for identifying real-time latency of audio/video streams includes buffering signatures of a reference audio/video stream and signatures of a test audio/video stream; constructing a needle as a vector including a set of signatures of the reference audio/video stream; computing correlations of the needle to successive vectors of sets of signatures of the test audio/video stream using a correlation function that calculates relatedness of the needle vector to each of the successive vectors of the test audio/video stream; identifying a synchronization offset between the test stream and the reference stream according to a maximum correlation point of the correlations of the needle to the successive sets of signatures of the test audio/video stream; and aligning the reference audio/video stream and the test audio/video stream according to the synchronization offset.

In a second illustrative example, a system for identifying real-time latency of audio/video streams, includes a computing device programmed to buffer signatures of a reference audio/video stream and signatures of a test audio/video stream; construct a needle as a vector including a set of signatures of the reference audio/video stream; compute correlations of the needle to successive vectors of sets of signatures of the test audio/video stream using a correlation function that calculates relatedness of the needle vector to each of the successive vectors of the test audio/video stream; identify a synchronization offset between the test stream and the reference stream according to a maximum correlation point of the correlations of the needle to the successive sets of signatures of the test audio/video stream; and align the reference audio/video stream and the test audio/video stream according to the synchronization offset.

In a third illustrative example, a non-transitory computer-readable medium includes instructions for identifying real-time latency of audio/video streams, that when executed by a processor of a computing device, cause the computing device to buffer signatures of a reference audio/video stream and signatures of a test audio/video stream; construct a needle as a vector including a set of signatures of the reference audio/video stream; compute correlations of the needle to successive vectors of sets of signatures of the test audio/video stream using a correlation function that calculates relatedness of the needle vector to each of the successive vectors of the test audio/video stream; identify a synchronization offset between the test stream and the reference stream according to a maximum correlation point of the correlations of the needle to the successive sets of signatures of the test audio/video stream; and align the reference audio/video stream and the test audio/video stream according to the synchronization offset.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Aspects of the disclosure generally relate to the distributed measurement of latency and synchronization delay between audio/video streams. As described herein, latency may refer to an amount of time for a unique media unit to reach between two measurement points. By distributed, it is meant that a system may be co-located but may perform a measurement from two or more data sources that may be geographically diverse. Synchronization delay may refer to the time offset between video latency and associated audio latency with additional delays due to decoding, filtering and rendering taken into account and then measured at two different point.

Figure 1:
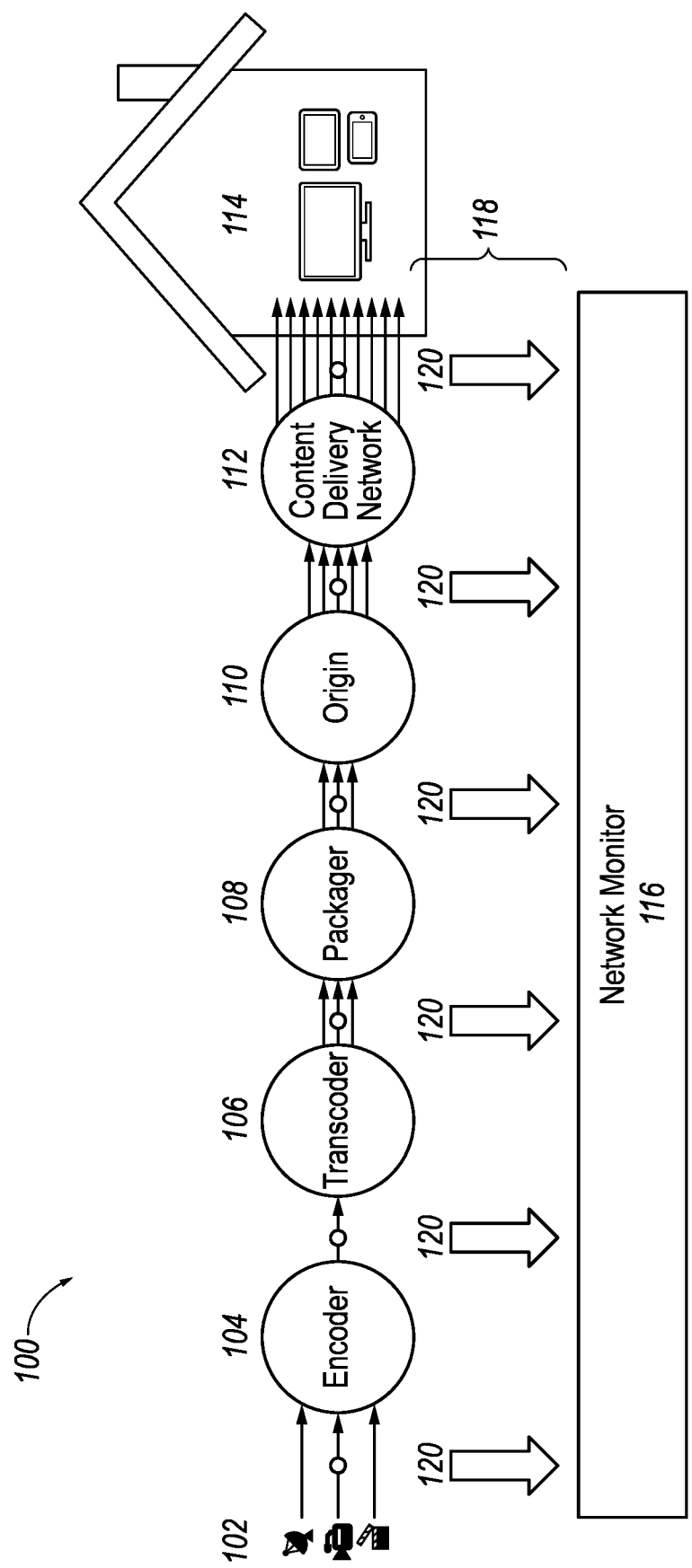
FIG. 1 illustrates an example of an end-to-end system for the measurement of latency between audio/video streams.

FIG. 1 illustrates an example of an end-to-end system 100 for the measurement of latency between audio/video streams. In the illustrated example, a video delivery chain includes a sequence of one or more encoder 104, transcoder 106, packager 108, origin 110, content delivery network 112, and home viewing device 114. Each of the devices along the video delivery chain may perform operations that involve video quality degradations and latencies. The source video feed may be in the format of many video formats, for example, SDI, transport stream, multicast IP, or mezzanine files from content producers/providers. For home TV, there are often set-top boxes that replay the received video streams to TV, e.g. through HDMI cables. As explained in detail below, a network monitor 116 may monitor the end-to-end system 100 for latency using signatures 118 computed from content streams at various points 120 along the video delivery chain. It should be noted that the delivery chain may be geographically diverse and that the calculations may occur co-located or in a distributed manner.

An instance of video content may include, as some examples, live video feeds from current events, prerecorded shows or movies, and advertisements or other clips to be inserted into other video feeds. The video content may include just video in some examples, but in many cases the video further includes additional content such as audio, subtitles, and metadata information descriptive of the content and/or format of the video. As shown, the system 100 includes one or more sources 102 of instances of video content. In general, when a video distributor receives source video, the distributor passes the video content through a sophisticated video delivery chain such as shown, including the series of content sources 102, encoders 104, transcoders 106, packagers 108, origins 110, content delivery networks 112, and consumer devices 114 to ultimately present the video content.

More specifically, one or more encoders 104 may receive the video content from the sources 102. The encoders 104 may be located at a head-end of the system 100. The encoders 104 may include electronic circuits and/or software configured to compress the video content into a format that conforms with one or more standard video compression specifications. Examples of video encoding formats include MPEG-2 Part 2, MPEG-4 Part 2, H.264 (MPEG-4 Part 10), HEVC, Theora, RealVideo RV40, VP9, and AV1. In many cases, the compressed video lacks some information present in the original video, which is referred to as lossy compression. A consequence of this is that decompressed video may have a lower quality than the original, uncompressed video.

One or more transcoders 106 may receive the encoded video content from the encoders 104. The transcoders 106 may include electronic circuits and/or software configured to re-encode the video content from a source format, resolution, and/or bit depth into an instance of video content with a different format, resolution, and/or bit depth. In many examples, the transcoders 106 may be used to create, for each received instance of video content, a set of time-aligned video streams, each with a different bitrate and frame size. This set of video streams may be referred to as a ladder or compression ladder. It may be useful to have different versions of the same video streams in the ladder, as downstream users may have different bandwidth, screen size, or other constraints. In some cases, the transcoders 106 may be integrated into the encoders 104, but in other examples the encoders 104 and transcoders 106 are separate components.

One or more packagers 108 may have access to the ladders for each of the instances of video content. The packagers 108 may include hardware and/or software configured to create segmented video files to be delivered to clients that then stitch the segments together to form a contiguous video stream. The segmented video may include video fragments, as well as a manifest that indicates how to combine the fragments. The packager 108 may sometimes be integrated into the encoder 104 and/or transcoder 106 that first creates the digital encoding of the instance of video content, but often it is a separate component. In one example, the transcoders 106 and packagers 108 may be located in a media data center between the head-end and the content delivery network 112.

The packagers 108 may provide the packaged video content to one or more origins 110 to the content delivery network 112. The origins 110 refer to a location of the content delivery network 112 to which video content enters the content delivery network 112. In some cases, the packagers 108 serve as origins 110 to the content delivery network 112, which in other cases, the packagers 108 push the video fragments and manifests into the origins 110. The content delivery network 112 may include a geographically-distributed network of servers and data centers configured to provide the video content from the origins 110 to destination consumer devices 114. The consumer devices 114 may include, as some examples, set-top boxes connected to televisions or other video screens, tablet computing devices, and/or mobile phones. Notably, these varied devices 114 may have different viewing conditions (including illumination and viewing distance, etc.), spatial resolution (e.g., SD, HD, full-HD, UHD, 4K, etc.), frame rate (15, 24, 30, 60, 120 frames per second, etc.), dynamic range (8 bits, 10 bits, and 12 bits per pixel per color, etc.). The consumer device 114 may execute a video player to play back the video content received to the devices 114 from the content delivery network 112.

The network monitor 116 may be configured to monitor the audio/video streams that are provided along the video delivery chain. In one example, the network monitor 116 may receive signatures 118 for the audio/video of the streams in a periodic manner from test points 120 along the multimedia delivery chain 100. In another example, the network monitor 116 may generate the signatures itself. The network monitor 116 may also align these streams with a different system that may or may not be co-located.

The network monitor 116 may execute an analyzer application to monitor the video and audio streams. The analyzer application may normalize the video and audio content before analysis. This normalization allows for a uniform approach to generating a signature that is not dependent on input frame rate or resolution.

In an example, the normalization process processes the video to a common resolution and framerate to support multiple cross input resolution and framerates (one example may be to take a 1920×1080p60 video and downconvert it to 640×360p30 video). The audio may also be normalized to a common channel layout and sample rate (one example may be to take a 5.1 channel 44.1 kHz audio signal and convert it to a mono 48000 Hz signal).

Once normalized, signature generation may produce signatures 120 from one or more signatures per video unit of time and one or more signatures per audio unit of time. A video unit of time may be a common frame rate such as 30 frames per second, where 1 frame time is $\frac{1}{30}$ second. An audio unit of time may be the inverse of the sampling rate (i.e., 48000 kHz audio would have an audio time of $\frac{1}{48000}$ second).

In one example, the video signatures 118 may be calculated according to an amount of intra frame activity. Intra frame activity may be defined, for example, as shown in equation (1):

$$\text{Luma Activity}(x, y) = \sum_{j=-2}^{2} \sum_{i=-2}^{2} \sum_{x,y} Y(x, y) - Y(x-1, y-1) \quad (1)$$

where:

Y is the Luma pixel values in a YUV colorspace.

It should be noted that the aforementioned approach to computing video signatures 118 is one example, and other techniques may additionally or alternately be used. For instance, an approach to computing video signatures 118 may include calculating the inter activity between frames. As another possibility, an approach to computing video signatures 118 may include computation of temporal Luma Activity.

With respect to the computation of audio signatures 118, the audio signature 118 may be computed by tracking a difference in audio over time via two or more filters (e.g., a low pass filter, an infinite impulse response (IIR) filter, etc.) and determining whether the audio sample is contributing or impacting the overall energy of the channel.

With these audio and video signatures 118 computed, the signature 118 data can be streamed remotely to a server of the network monitor 116. This data may be streamed with additional pieces of information as well, such as a time at which the sample (audio or video) should be displayed (sometimes referred to as presentation time stamp (PTS)), as well as the time the sample (audio or video) was captured (sometimes referred to as wallclock time).

This triplet of data, (e.g., the signatures 118, PTS time, and wallclock time) for each sample may be streamed remotely (e.g., to the network monitor 116) and buffered. The amount buffered is equivalent to the greatest delay between test points. In an example broadcast implementation, the network monitor 116 may buffer up to one minute of data.

Figure 2:
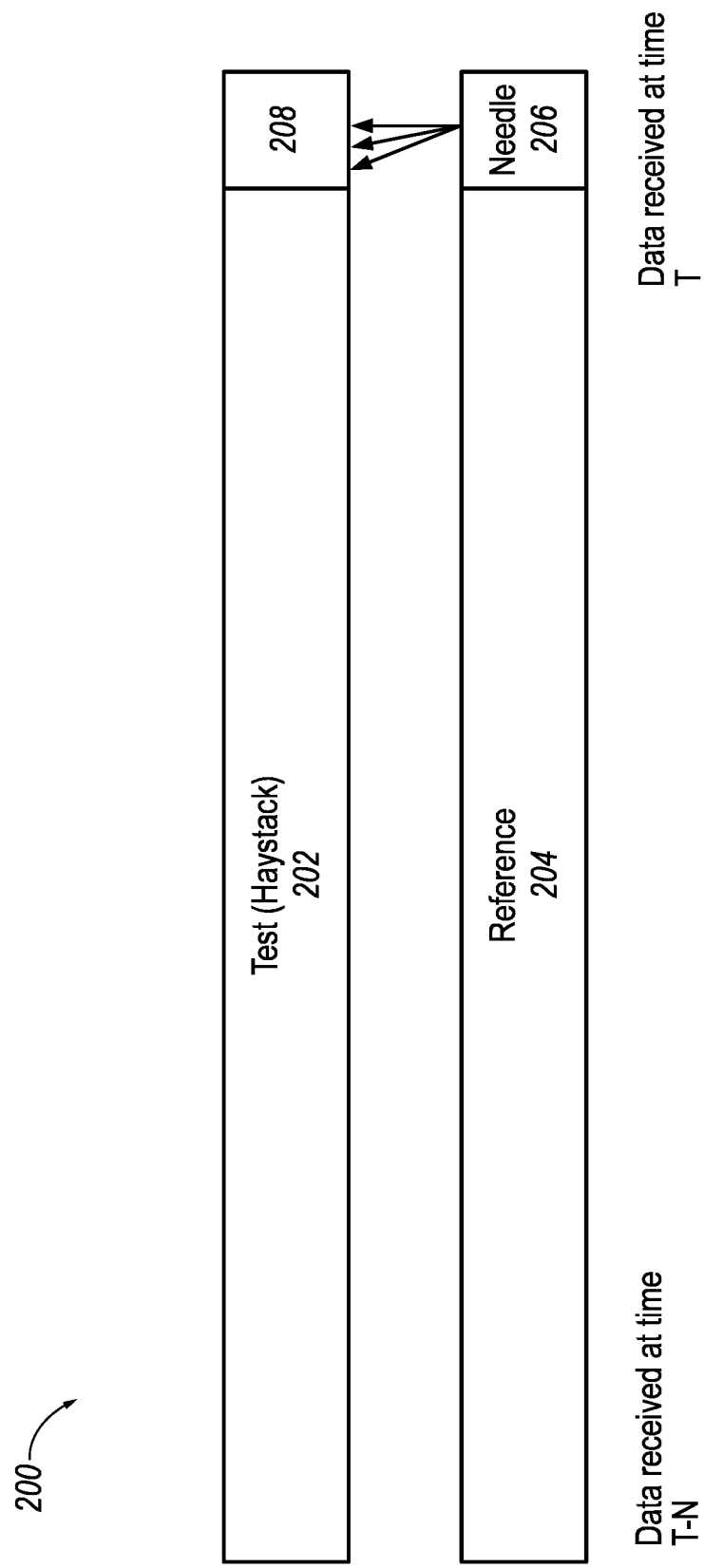
FIG. 2 illustrates an example of streams to be compared.

FIG. 2 illustrates an example of streams to be compared. In many configurations, there is a test stream 202 and a reference stream 204. As described herein, these streams 202, 204 would typically include an audio/video pair. In a distributed system that includes multiple test points 120 and multiple audio streams, this can quickly become a large number of pairs. For instance, an audio/video signature 118 pair may be taken at the input of the encoder 104, the output of the encoder 104, the output of the transcoder 106, the output of packager 108, or at any other point.

If, for example, the output of the encoder 104 (and input of the transcoder 106) has one video stream and three audio streams, there would be three pairs as shown in Table 1.

TABLE 1

Example Audio/Video Pairs at Encoder Output

| Transcoder Input Stream Pair | Stream Values |
| --- | --- |
| 1 | Video 1, Audio 1 |
| 2 | Video 1, Audio 2 |
| 3 | Video 1, Audio 3 |

This can be repeated at the output of the transcoder 106 where there may be, for example, three video streams and three audio streams, as shown in Table 2.

TABLE 2

Example Audio/Video Pairs at Transcoder Output

| Transcoder Output Stream Pairs | Stream Values |
| --- | --- |
| 1 | Video 1, Audio 1 |
| 2 | Video 1, Audio 2 |
| 3 | Video 1, Audio 3 |
| 4 | Video 2, Audio 1 |

TABLE 2-continued

Example Audio/Video Pairs at Transcoder Output

| Transcoder Output Stream Pairs | Stream Values |
| --- | --- |
| 5 | Video 2, Audio 2 |
| 6 | Video 2, Audio 3 |
| 7 | Video 3, Audio 1 |
| 8 | Video 3, Audio 2 |
| 9 | Video 3, Audio 3 |

The data of the audio/video pairs may be streamed in an independent manner. For instance, data for the transcoder 106 output stream pair video 3 may be transmitted once (and used for each of audio 1, 2, and 3), not transmitted once for each audio stream. The data may be received and buffered by the network monitor 116. The amount buffered should be large enough to capture the largest delay between the test points 120.

As the data is streamed into the network monitor 116, a reference stream 204 is selected and is tested along all other vectors of data (e.g., the test streams 202). Once there are at least a sufficient number of samples, a correlation between the streams of signatures 118 may be calculated. For instance, this correlation may be determined between a needle 206 of the reference stream 204 and a test portion 208 of the test streams 202.

Figure 3:
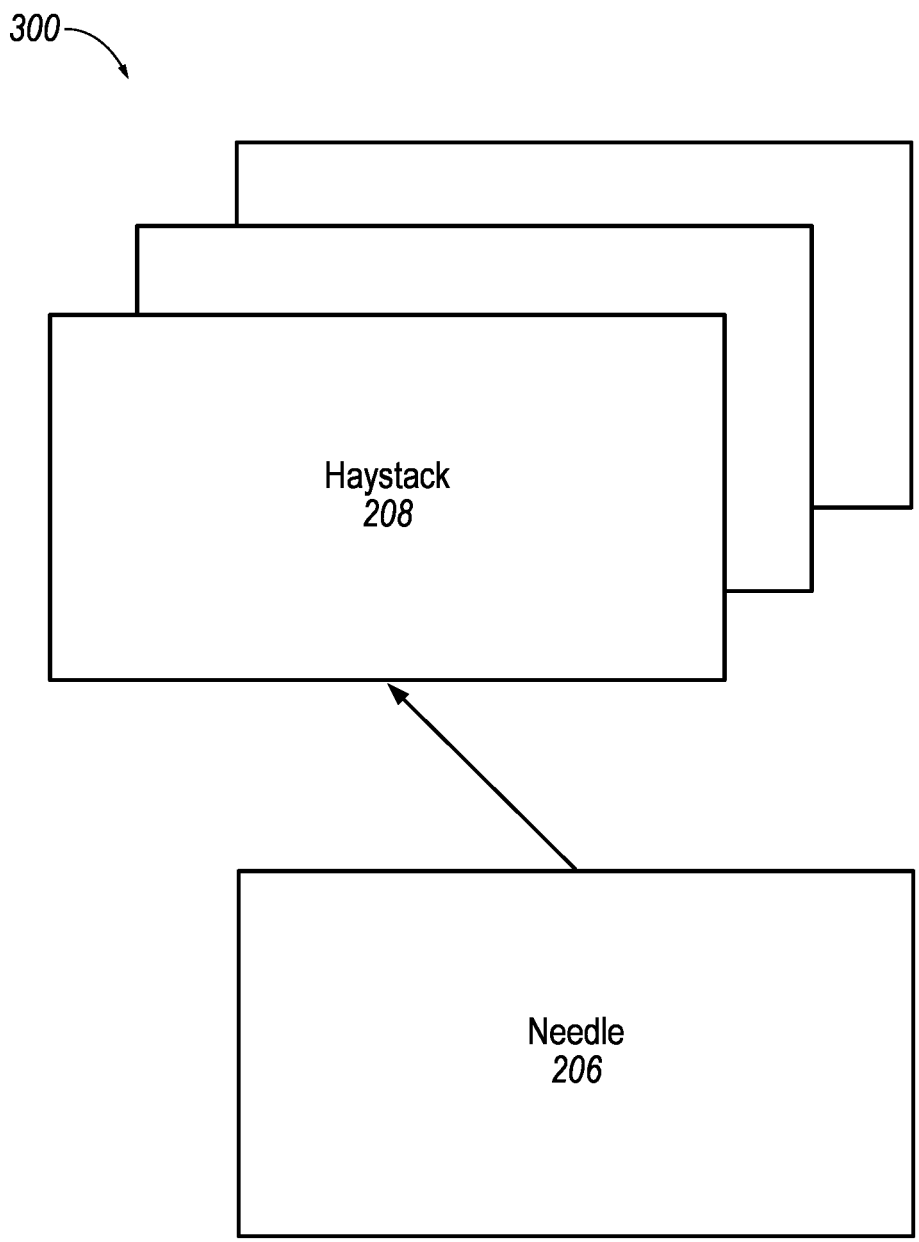
FIG. 3 illustrates a further detail of the comparison of a needle portion of the reference stream to test portions of multiple test streams.

FIG. 3 illustrates a further detail of the comparison of the needle 206 portion of the reference stream 204 to test 208 portions of multiple test streams 202. As shown, the needle 206 portion is being compared to an example set of test portions 208 of three test streams 202, to determine a correlation between the needle 206 and each of the test portions 208.

A correlation function may be used to determine the correlation between the streams of signatures 118. In general, a correlation function operates on two sets of vectors and calculates how closely the two vectors are related. One correlation function that may be used is the Pearson Linear Correlation Coefficient (PLCC) but other correlation function may be used as well. As some other examples, mean squared error (MSE), root mean squared error (RMSE), mean absolute error (MAE), peak signal-to-noise ratio (PSNR), Spearman's rank correlation coeffect (SRCC), and/or Kendall's rank correlation coefficient (KRCC) may additionally or alternatively be used.

As noted, the input to the correlation function may be represented as two vectors to be compared. In one example, these vectors may be defined, as shown in equation (2):

$$a_l^k = \{a[l], a[l+1], \ldots, a[k]\} \quad (2)$$

This is an example where the needle 206 is selected at the most recent point in the data stream. However, it should be noted that the needle 206 can be selected at any point within the reference stream 204. Selecting the needle 206 in a test stream 202 makes that stream the reference stream 204, and the reference stream 204 would then become a test stream 202.

The correlation is calculated at each position within the haystack test portion 208. The resulting vector of correlation values with the associated index within the data stream may then be sorted and the maximum may be taken, as shown in equation (3):

$$\forall i \in \{0, 1, \ldots, m-n\}, CC[i] = C(x_i^{i+n-1}, y_{m-n}^{m-1}) \quad (3)$$

where:

CC is the vector of correlation coefficient,

C is the correlation function;
i a time index into the stream;
m is the total size of the haystack;
y is referred to as the needle;
n is the size of the needle; and
x is the haystack.

Figure 4:
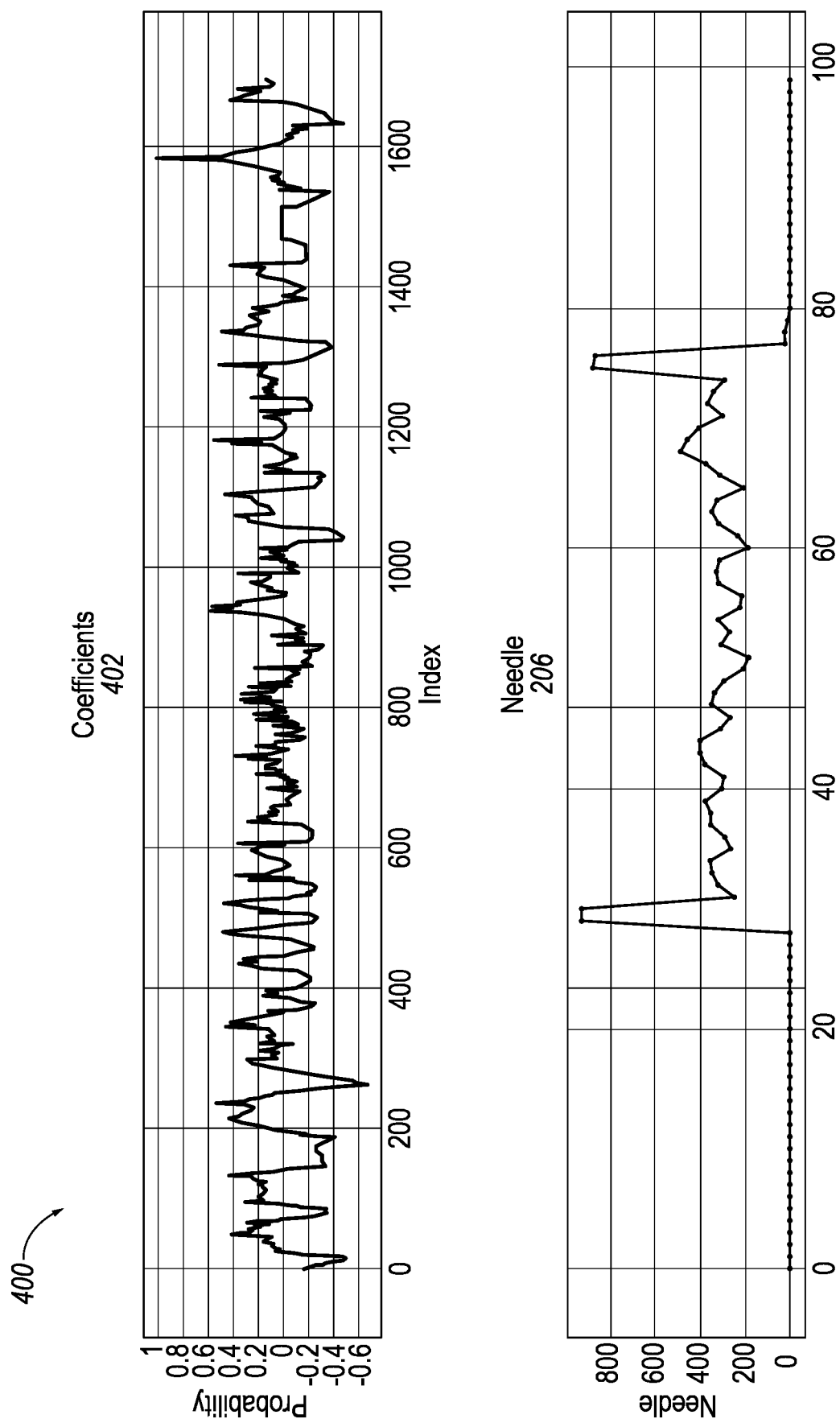
FIG. 4 illustrates an example of a needle along with a correlation coefficient for a test stream.

FIG. 4 illustrates an example of a needle 206 along with CC for a test stream 202. As shown, the needle 206 provides a reference pattern for the comparison, and the coefficients 402 vary in probability over a time index to illustrate the relative probability of a match. Notably, a relative maximum probability may be seen shy of index 1600, indicating a most likely offset.

To continue with the example used above, thirty frames per second for one minute would have 1,800 samples, with an n of 100 samples. If the max CC is greater than a threshold confidence value (for example >98%), then this may be assumed to be a valid synchronization point between the streams 202, 204.

The starting index i of the vector may be used to look up the wallclock and PTS times at the synchronization point for that stream 202, as the needle 206 may be fixed at m−n while the haystack test portion 208 may vary based on the value above. This is illustrated in equation (4) as follows:

$$\text{Delay}(x,y) = WC(x(i)) - WC(y(m-n)) \quad (3)$$

where:
WC is the wallclock time;
x and y are vectors of the same size of video signatures of the needle and haystack, respectively;
i is the index found within x that has a high CC with y; and
(m−n) is the size of the needle searched within x.

When audio is introduced, the above calculation can be duplicated, but, instead of using wallclock time, the PTS may be used instead. Additionally, the video needle and haystack variables x and y may be replaced with a and b for the needle and haystack of the audio, respectively. Thus, the synchronization offset may be provided as follows in equation (4):

$$\text{SynchronizationOffset}(a,b,x,y) = (PTS(x(i_{video})) - PTS(y(m_{video}-n_{video}))) - (PTS(a(i_{audio})) - PTS(b(m_{audio}-n_{audio}))) \quad (4)$$

Assuming, in one illustrative example, a 90 kHz clock for PTS, the synchronization offset may, accordingly, determine utilizing the clock by how much the audio and video pair are out of sync.

This synchronization-determining process may be calculated at various intervals. In one example, the process may be performed on every sample that comes in. In another example, the process may be performed periodically. For instance, to ensure that the synchronization offset or delay has not changed, the above process can be calculated in a period manner.

As another example, further processing may be performed to ensure that the calculation remains correct. An example would be if the max video CC is >98% for a five-sample period, it can be assumed that the synchronization point is valid. This may be because the synchronization point is the point where the correlation coefficient is maximized. In this example, every time a CC that is ⇐98% is encountered, confidence in the algorithm may be reduced, e.g., by 50%. If multiple low-confidence values are reached, the buffer may be flushed and the synchronization-determining process restarted from the beginning.

Optimizations can occur by not always selecting the first m−n samples to act as a needle. Instead, searching the reference vector for a window of (m−n) samples with high variance may increase the probability of finding a high CC. Additionally, increasing the size of the (m−n) window may improve finding a high CC, with a tradeoff of requiring additional processing time. As another possible optimization, when a synchronization point is found, instead of starting the search at the beginning of the next evaluation period, the process can do a preliminary check that the synchronization point remains correct, and only do a full search when the CC is below an acceptable threshold.

Another situation that may be considered is if the max CC drops below an acceptable threshold. If the max CC drops below an acceptable threshold for a number of sample periods, then it can be determined that the audio or video content has become too similar. If the content becomes too similar for a period, then the buffered data can be flushed and the process may restart from an empty buffer to try again to identify the synchronization offsets and delays.

The described synchronization approach may also be useful for other applications. As one possibility, if the CC is low between two streams, then it can be inferred that the content of the two streams is wildly different. This may be useful where determination of the two streams is critical to operations. For instance, one stream may have invertibly been changed to provide different content, or there may be a significant introduction of noise into a stream along the video delivery chain.

Figure 5:
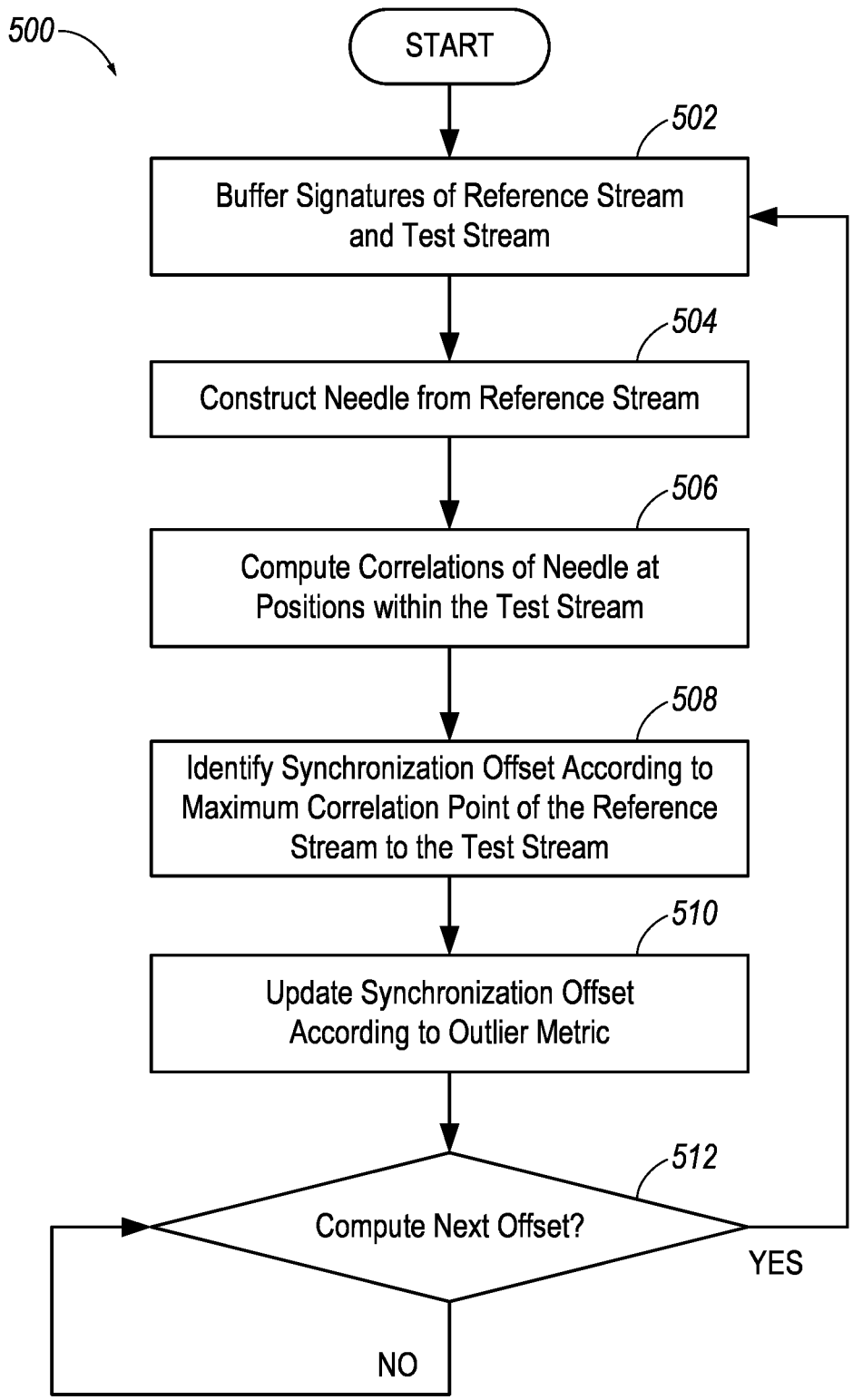
FIG. 5 illustrates an example process for the measurement of latency between audio/video streams.

FIG. 5 illustrates an example process 500 for the measurement of latency between audio/video streams. In an example, the process 500 may be performed by the network monitor 116 in the context of the system 100.

At operation 502, the network monitor 116 buffers signatures 118 of a reference stream 204 and signatures 118 of one or more test streams 202. For instance, the video signatures 118 include information calculated according to an amount of intra frame activity, while the audio signature 118 may be computed by tracking a difference in audio over time via two or more filters (e.g., a low pass filter, an infinite impulse response (IIR) filter, etc.) and determining whether the audio sample is contributing or impacting the overall energy of the channel. The network monitor 116 may receive the signatures 118 from test points 120 along the multimedia delivery chain 100. For instance, audio/video signature 118 pairs may be taken at the input of the encoder 104, the output of the encoder 104, the output of the transcoder 106, the output of packager 108, or at any other point along the multimedia delivery chain 100. The network monitor 116 may buffer enough data to ensure capture of the largest delay between the test points 120. In an example, the network monitor 116 may buffer one second of the signatures 118.

At operation 504, the network monitor 116 constructs a needle 206 from the reference stream 204. In an example, the needle 206 is selected as the most recent set of n points in the reference data stream, where n is the size of the needle. The size n may be set to balance finding a high CC, with the amount or processing time that is required to perform the CC computations.

At operation 506, the network monitor 116 computes correlations of the needle 206 at each position within the test stream 202. In an example, the network monitor 116 compares the needle 206 portion to successive sets of test portions 208 (e.g., advancing a window size of n in one sample increments of the one or more test streams 202), to determine a correlation between the needle 206 and each of the test portions 208. The input to the correlation function may be represented as vectors to be compared, and the correlation function may be designed to operate on the two sets of vectors to calculate how closely related the two vectors are. As some possibilities, the correlation function may include one or more of PLCC, MSE, RMSE, MAE, PSNR, SRCC, or RRCC.

At operation 508, the network monitor 116 identifies a synchronization offset for each of the one or more test streams 202 compared to the reference stream 204. In an example, the synchronization offset for a test stream 202 may be identified as the maximum correlation point of correlations of the needle 206 at each position within the test stream 202. In some implementations, multiple consecutive consistent maximum correlation points may be required to confirm the synchronization offset.

At operation 510, the network monitor 116 updates the synchronization offset according to the outlier metric for the identified synchronization offset of operation 508. This may be desirable because sometimes the alignment offset found at operation 508 may change significantly on a per-iteration basis (e.g., the offset for a first iteration is at 100 frames but for a next iteration is at 1000 frames). To prevent excessive bounce from occurring, additional verification may be performed before acceptance of the latest offset. This verification allows the network monitor 116 to compare the synchronization offset for the current iteration with one or more synchronization offsets computed in previous iterations of the process 500. If the synchronization offset is comparable, then the latest synchronization offset may be used as the new offset. If synchronization offset does not appear valid, then the synchronization offset may be ignored.

A function may be applied that determines whether the current value is an outlier from the previous N values. One such function may be to determine whether the synchronization offset minus the median value of previous N synchronization offsets (the median absolute difference) is less than a threshold value. If so, then the synchronization offset for the frame is accepted; otherwise, the synchronization offset for the frame is rejected. Another such function may take the mean absolute error of the current synchronization offset from the mean of the previous N synchronization offset values. If the mean absolute error is less than 2 standard deviations of the N values (for example), then the synchronization offset may be accepted; otherwise, the synchronization offset is rejected.

For sake of example, N may be from 1-5, but any amount of synchronization offset slots may be used. These slots may also be reset upon various conditions, such as transition to a new video segment, detection of a change to a new resolution, etc.

At operation 512, the network monitor 116 determines whether to compute a next synchronization offset. In one example, the network monitor 116 sets a timer to periodically recalculate the synchronization offset(s). If so and the timer expired, control returns to operation 502. If not, then the process 500 may remain at operation 512. In another example, the network monitor 116 tracks whether the synchronization offset no longer provides a high correlation coefficient, such that control returns to operation 502 responsive to a drop in the correlation coefficient below a threshold confidence. If not, then the process 500 may remain at operation 512. In yet a further example, the synchronization offset is continually updated and the process 500 simply loops from operation 512 to operation 502. As yet a further possibility, the synchronization offset is completed once, and after operation 512 the process 500 ends (not shown).

Figure 6:
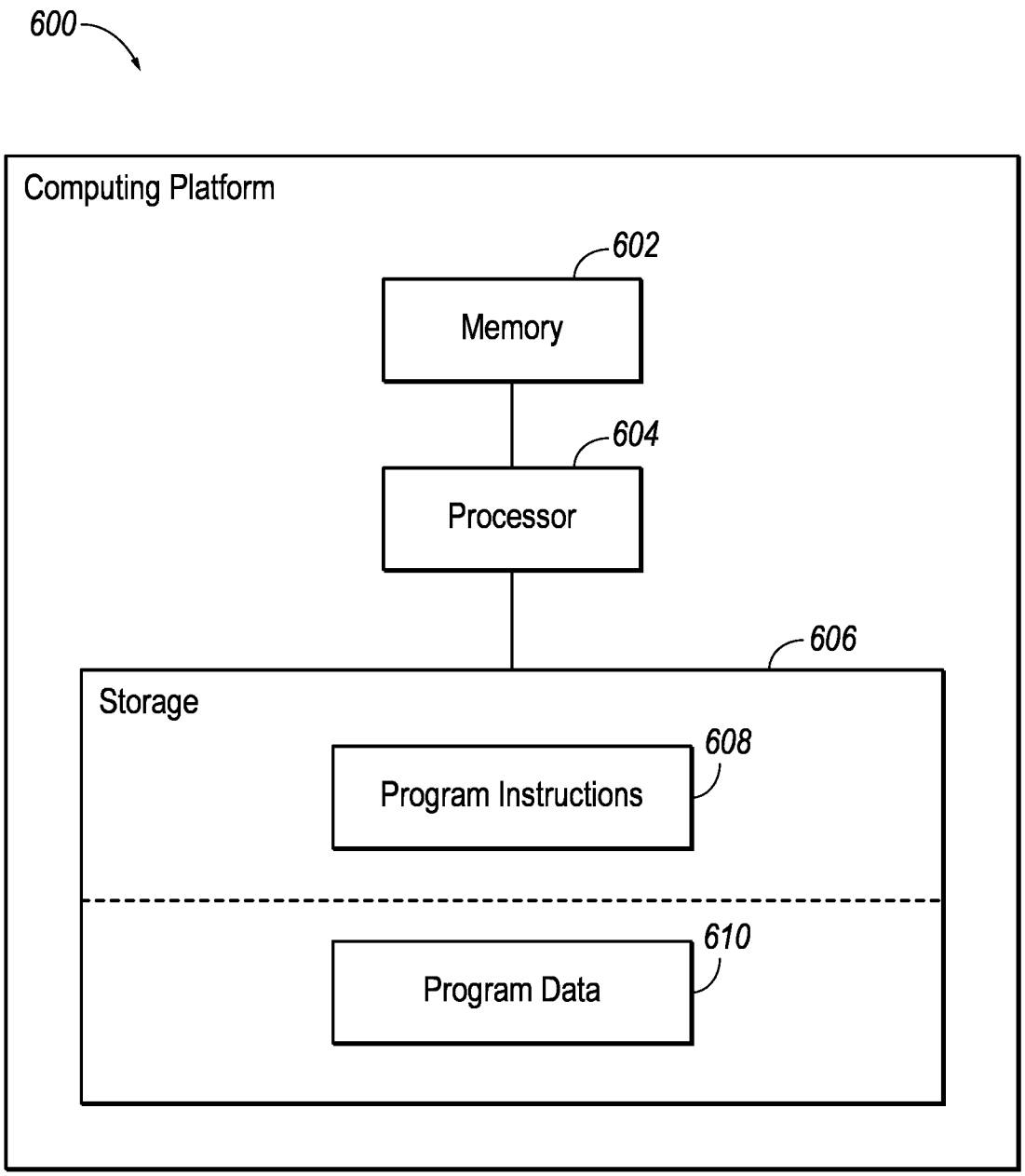
FIG. 6 illustrates an example of an end-to-end system for the measurement of latency between audio/video streams.

FIG. 6 illustrates an example computing device 600 for use in the measurement of latency between audio/video streams. The algorithms and/or methodologies of one or more embodiments discussed herein may be implemented using such a computing device. For instance, the operations performed herein by the network monitor 116, such as those of the process 500, may be implemented with such a computing device 600. The computing device 600 may include memory 602, processor 604, and non-volatile storage 606. The processor 604 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 602. The memory 602 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 606 may include one or more persistent data storage devices such as a hard drive, optical drive, tape drive, non-volatile solid-state device, cloud storage or any other device capable of persistently storing information.

The processor 604 may be configured to read into memory 602 and execute computer-executable instructions residing in program instructions 608 of the non-volatile storage 606 and embodying algorithms and/or methodologies of one or more embodiments. The program instructions 608 may include operating systems and applications. The program instructions 608 may be compiled or interpreted from computer programs created using a variety of programming languages and/or technologies, including, without limitation, and either alone or in combination, JAVA, C, C++, C#, OBJECTIVE C, FORTRAN, PASCAL, JAVA SCRIPT, PYTHON, PERL, and PL/SQL.

Upon execution by the processor 604, the computer-executable instructions of the program instructions 608 may cause the computing device 600 to implement one or more of the algorithms and/or methodologies disclosed herein. The non-volatile storage 606 may also include data 610 supporting the functions, features, and processes of the one or more embodiments described herein. This data 610 may include, as some examples, data of the test streams 202 and reference streams 204, needle 206, and computed offset results.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for identifying real-time latency of audio/video streams, comprising:
    buffering signatures of a reference audio/video stream and signatures of a test audio/video stream;
    constructing a needle as a vector including a set of signatures of the reference audio/video stream, the set of signatures including a set of video signatures of the reference audio/video stream and one or more sets of audio signatures of the reference audio/video stream, wherein the needle is selected to include a most recent set of n signatures in the reference audio/video stream;
    computing correlations of the needle to successive vectors of sets of signatures of the test audio/video stream using a correlation function that calculates relatedness of the needle vector to each of the successive vectors of the test audio/video stream, the correlation function comparing the set of video signatures of the reference audio/video stream to video signatures of the test audio/video stream and comparing the one or more sets of audio signatures to audio signatures of the test audio/video stream, wherein the successive sets of signatures of the test audio/video stream each include n signatures and the correlation function calculates how closely the needle of the reference audio/video stream and the vectors of the test audio/video stream are related;
    identifying a synchronization offset between the test stream and the reference stream according to a maximum correlation point of the correlations of the needle to the successive sets of signatures of the test audio/video stream; and
    aligning the reference audio/video stream and the test audio/video stream according to the synchronization offset.

2. The method of claim 1, further comprising simultaneously displaying the reference audio/video stream and the test audio/video stream as aligned.

3. The method of claim 1, wherein the video signatures are calculated according to an amount of activity within a frame and adjacent frames and the audio signatures are calculated by tracking a difference in audio samples over time.

4. The method of claim 1, wherein the reference audio/video stream is calculated from an audio/video stream at a first point along a multimedia delivery chain, and the test audio/video stream is calculated from the audio/video stream at a second point along the multimedia delivery chain.

5. The method of claim 1, wherein the needle is selected either to accommodate searching for different synchronization offset ranges or based on other statistical features.

6. The method of claim 1, wherein the correlation function utilizes one or more of Pearson Linear Correlation Coefficient (PLCC), mean squared error (MSE), root mean squared error (RMSE), mean absolute error (MAE), peak signal-to-noise ratio (PSNR), Spearman's rank correlation coeffect (SRCC), or Kendall's rank correlation coefficient (KRCC).

7. The method of claim 1, further comprising recomputing the synchronization offset responsive to the synchronization offset failing to provide a correlation coefficient above a predefined threshold correlation.

8. The method of claim 1, further comprising preprocessing the audio/video streams into a common audio format and a common video format to assist in generating the signatures of the reference audio/video stream and the signatures of the test audio/video stream.

9. The method of claim 1, further comprising:
determining an outlier metric for the synchronization offset in comparison to one or more previous synchronization offsets; and
updating the synchronization offset based on the outlier metric indicating that the synchronization offset is not an outlier.

10. The method of claim 9, wherein the outlier metric includes determining a median absolute difference for the one or more previous synchronization offsets; and further comprising accepting the synchronization offset responsive to a difference between the synchronization offset and the median absolute difference being within a threshold value.

11. The method of claim 9, wherein the outlier metric includes determining a mean absolute error of the synchronization offset compared to a mean of the one or more previous synchronization offsets; and further comprising accepting the synchronization offset responsive to the mean absolute error being less than two standard deviations from the mean.

12. A system for identifying real-time latency of audio/video streams, comprising:
a computing device programmed to:
buffer signatures of a reference audio/video stream and signatures of a test audio/video stream;
construct a needle as a vector including a set of signatures of the reference audio/video stream, the set of signatures including a set of video signatures of the reference audio/video stream and one or more sets of audio signatures of the reference audio/video stream, wherein the needle is selected to include a most recent set of n signatures in the reference audio/video stream;
compute correlations of the needle to successive vectors of sets of signatures of the test audio/video stream using a correlation function that calculates relatedness of the needle vector to each of the successive vectors of the test audio/video stream, the correlation function comparing the set of video signatures of the reference audio/video stream to video signatures of the test audio/video stream and comparing the one or more sets of audio signatures to audio signatures of the test audio/video stream, wherein the successive sets of signatures of the test audio/video stream each include n signatures and the correlation function calculates how closely the needle of the reference audio/video stream and the vectors of the test audio/video stream are related;
identify a synchronization offset between the test stream and the reference stream according to a maximum correlation point of the correlations of the needle to the successive sets of signatures of the test audio/video stream; and
align the reference audio/video stream and the test audio/video stream according to the synchronization offset.

13. The system of claim 12, wherein the computing device is further programmed to simultaneously display the reference audio/video stream and the test audio/video stream as aligned.

14. The system of claim 12, wherein the video signatures are each calculated according to an amount of activity within a frame and adjacent frames and the audio signatures are calculated by tracking a difference in audio samples over time.

15. The system of claim 12, wherein the computing device is further programmed to:
calculate the reference audio/video stream from an audio/video stream at a first point along a multimedia delivery chain; and
calculate the test audio/video stream from the audio/video stream at a second point along the multimedia delivery chain.

16. The system of claim 12, wherein the computing device is further programmed to select the needle either to accommodate searching for different synchronization offset ranges or based on other statistical features.

17. The system of claim 12, wherein the correlation function utilizes one or more of Pearson Linear Correlation Coefficient (PLCC), mean squared error (MSE), root mean squared error (RMSE), mean absolute error (MAE), peak signal-to-noise ratio (PSNR), Spearman's rank correlation coeffect (SRCC), or Kendall's rank correlation coefficient (KRCC).

18. The system of claim 12, wherein the computing device is further programmed to recompute the synchronization offset responsive to the synchronization offset failing to provide a correlation coefficient above a predefined threshold correlation.

19. The system of claim 12, wherein the computing device is further programmed to preprocess the audio/video streams into a common audio format and a common video format to assist in generating the signatures of the reference audio/video stream and the signatures of the test audio/video stream.

20. The system of claim 12, wherein the computing device is further programmed:
determine an outlier metric for the synchronization offset in comparison to one or more previous synchronization offsets; and
update the synchronization offset based on the outlier metric indicating that the synchronization offset is not an outlier.

21. The system of claim 20, wherein the outlier metric includes determining a median absolute difference for the one or more previous synchronization offsets; and the computing device is further programmed to accept the synchronization offset responsive to a difference between the synchronization offset and the median absolute difference being within a threshold value.

22. The system of claim 20, wherein the outlier metric includes determining a mean absolute error of the synchronization offset compared to a mean of the one or more previous synchronization offsets; and the computing device is further programmed to accept the synchronization offset responsive to the mean absolute error being less than two standard deviations from the mean.

23. A non-transitory computer-readable medium comprising instructions for identifying real-time latency of audio/video streams, that when executed by a processor of a computing device, cause the computing device to:
buffer signatures of a reference audio/video stream and signatures of a test audio/video stream;
construct a needle as a vector including a set of signatures of the reference audio/video stream, the set of signatures including a set of video signatures of the reference audio/video stream and one or more sets of audio signatures of the reference audio/video stream, wherein the needle is selected to include a most recent set of n signatures in the reference audio/video stream;
compute correlations of the needle to successive vectors of sets of signatures of the test audio/video stream using a correlation function that calculates relatedness of the needle vector to each of the successive vectors of the test audio/video stream, the correlation function comparing the set of video signatures of the reference audio/video stream to video signatures of the test audio/video stream and comparing the one or more sets of audio signatures to audio signatures of the test audio/video stream, wherein the successive sets of signatures of the test audio/video stream each include n signatures and the correlation function calculates how closely the needle of the reference audio/video stream and the vectors of the test audio/video stream are related;
identify a synchronization offset between the test stream and the reference stream according to a maximum correlation point of the correlations of the needle to the successive sets of signatures of the test audio/video stream; and
align the reference audio/video stream and the test audio/video stream according to the synchronization offset.

24. The medium of claim 23, wherein the signatures include video signatures each calculated according to an amount of activity within a frame and adjacent frames and audio signatures calculated by tracking a difference in audio samples over time.

25. The medium of claim 23, further comprising instructions that when executed by the processor of the computing device, cause the computing device to:
calculate the reference audio/video stream from an audio/video stream at a first point along a multimedia delivery chain; and
calculate the test audio/video stream from the audio/video stream at a second point along the multimedia delivery chain.

26. The medium of claim 23, further comprising instructions that when executed by the processor of the computing device, cause the computing device to select the needle either to accommodate searching for different synchronization offset ranges or based on other statistical features.

27. The medium of claim 23, wherein the correlation function utilizes one or more of Pearson Linear Correlation Coefficient (PLCC), mean squared error (MSE), root mean squared error (RMSE), mean absolute error (MAE), peak signal-to-noise ratio (PSNR), Spearman's rank correlation coeffect (SRCC), or Kendall's rank correlation coefficient (KRCC).

28. The medium of claim 23, further comprising instructions that when executed by the processor of the computing device, cause the computing device to recompute the synchronization offset responsive to the synchronization offset failing to provide a correlation coefficient above a predefined threshold correlation.

29. The medium of claim 23, further comprising instructions that when executed by the processor of the computing device, cause the computing device to preprocess the audio/video streams into a common audio format and a common video format to assist in generating the signatures of the reference audio/video stream and the signatures of the test audio/video stream.

30. The medium of claim 23, further comprising instructions that when executed by the processor of the computing device, cause the computing device to:
determine an outlier metric for the synchronization offset in comparison to one or more previous synchronization offsets; and
update the synchronization offset based on the outlier metric indicating that the synchronization offset is not an outlier.

31. The medium of claim 30, wherein the outlier metric includes determining a median absolute difference for the one or more previous synchronization offsets; and further comprising instructions that when executed by the processor of the computing device, cause the computing device to accept the synchronization offset responsive to a difference between the synchronization offset and the median absolute difference being within a threshold value.

32. The medium of claim 30, wherein the outlier metric includes determining a mean absolute error of the synchronization offset compared to a mean of the one or more previous synchronization offsets; and further comprising instructions that when executed by the processor of the computing device, cause the computing device to accept the synchronization offset responsive to the mean absolute error being less than two standard deviations from the mean.

33. The method of claim 8, wherein the common audio format is a mono signal at a common sample rate, and the common video format is a common resolution and common framerate.

* * * * *